May 9, 1933.  E. J. HARDTKE  1,907,798
SLIDING WINDOW CONSTRUCTION
Filed Jan. 5, 1931  3 Sheets-Sheet 1

INVENTOR.
Edward J. Hardtke.
BY
ATTORNEYS

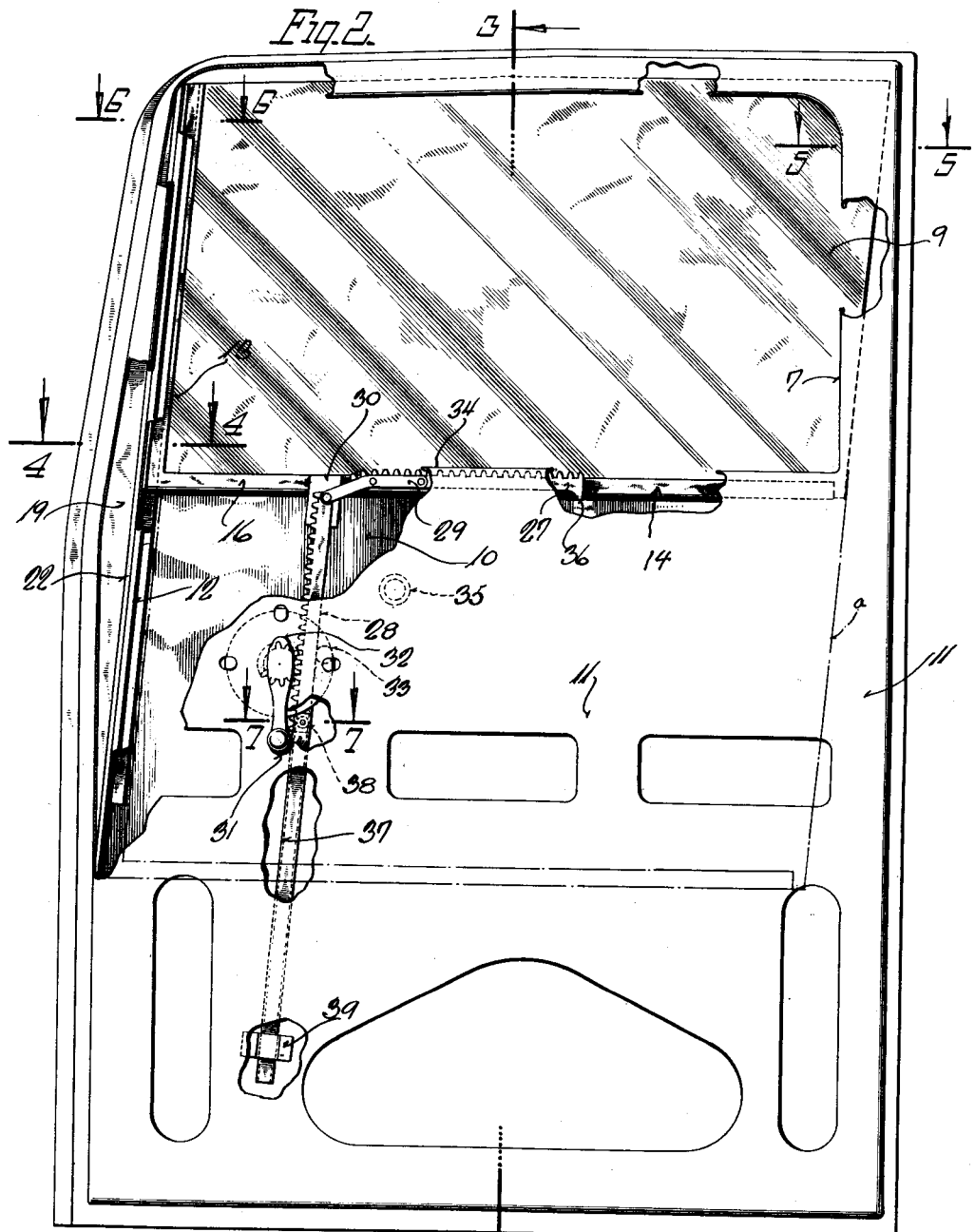

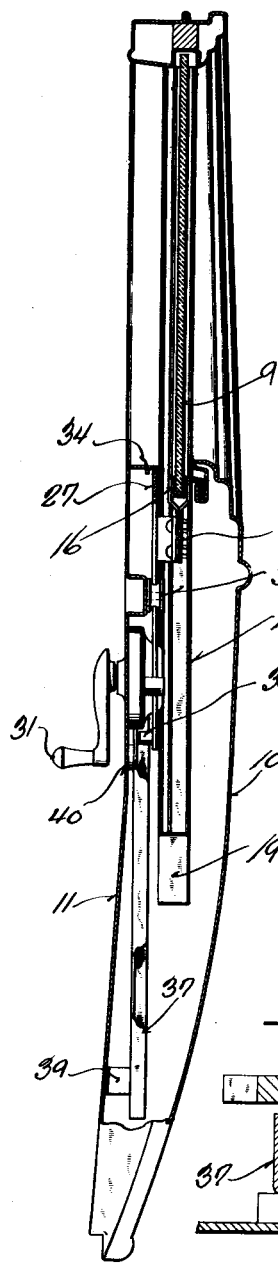
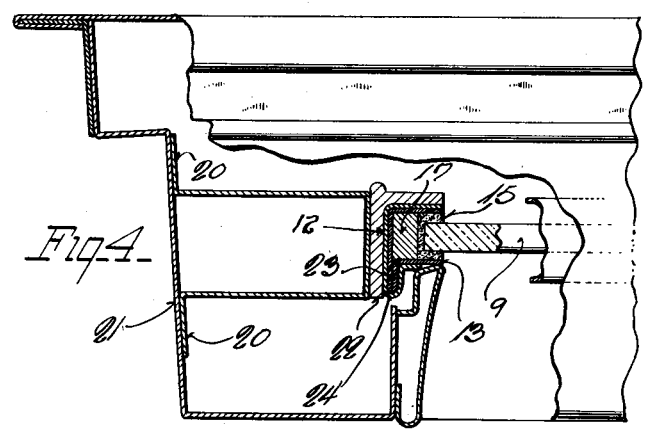
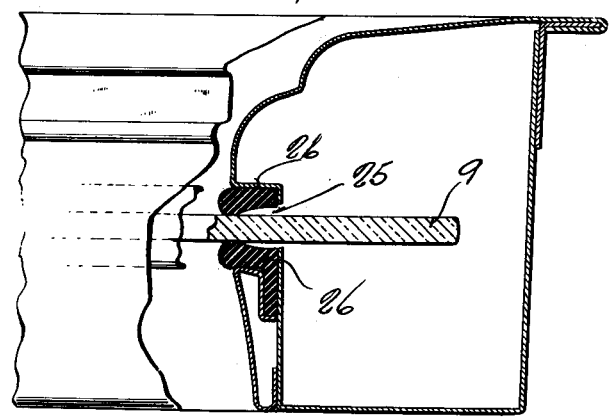
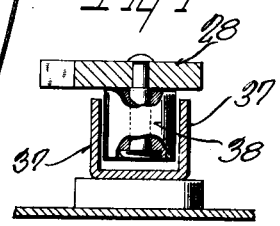
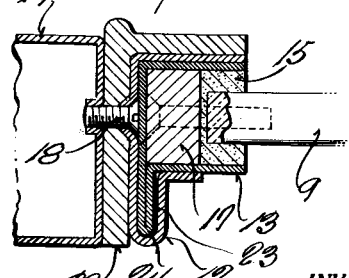

Patented May 9, 1933

1,907,798

UNITED STATES PATENT OFFICE

EDWARD J. HARDTKE, OF MILWAUKEE, WISCONSIN, ASSIGNOR TO SEAMAN BODY CORPORATION, OF MILWAUKEE, WISCONSIN, A CORPORATION OF WISCONSIN

SLIDING WINDOW CONSTRUCTION

Application filed January 5, 1931. Serial No. 506,692.

This invention relates to a sliding window construction for automobile doors.

The present tendency in inclosed body design for motor vehicles is to provide a non-glare windshield by having the windshield inclined rearwardly. In these constructions, the front edges of the front doors along the window openings therein are constructed to follow the inclination given to the windshield. By this arrangement, the window glass for the opening of each door must be set to move obliquely in the vertical plane of the door in the opening and closing of the window opening, so that no gaps are provided between the window glass or pane and the opening in the door when the glass is in lowered position.

One object of my invention is to provide a mounting for the window glass or pane in an opening of this character, and more particularly to provide a mounting wherein the pane is supported and guided at its forward edge only, thereby avoiding the necessity and expense of using and providing a guide or support for the rear edge of the pane in its opening and closing movement.

A further object of my invention is to provide a supplemental guide for the pane and have such guide cooperable with the pane raising and lowering mechanism with which the door is provided, so as to avoid any possible canting of the pane to effect its ease of operation or place any undue strain on the pane supporting means.

A further object of my invention is to provide a construction whereby the raising and lowering mechanism may apply its force adjacent the front edge of the pane, and thus facilitate providing the support at such edge.

A further object of the invention is to provide a guide means which is simple in construction and easy to install and which does not require any expensive or elaborate supporting members or parts in the door structure itself.

The invention consists further in the matters hereinafter described and claimed.

In the accompanying drawings:

Fig. 3 is a vertical sectional view taken on line 3—3 of Fig. 2;

Fig. 4 is an enlarged horizontal sectional view taken on line 4—4 of Fig. 2;

Fig. 5 is a similar view taken on line 5—5 of Fig. 2;

Fig. 6 is a similar view taken on line 6—6 of Fig. 2;

Fig. 7 is a horizontal sectional view taken on line 7—7 of Fig. 2; and

Fig. 8 is a perspective view showing a window pane and guide channel construction for the forward edge thereof in accordance with my invention.

Figure 1:
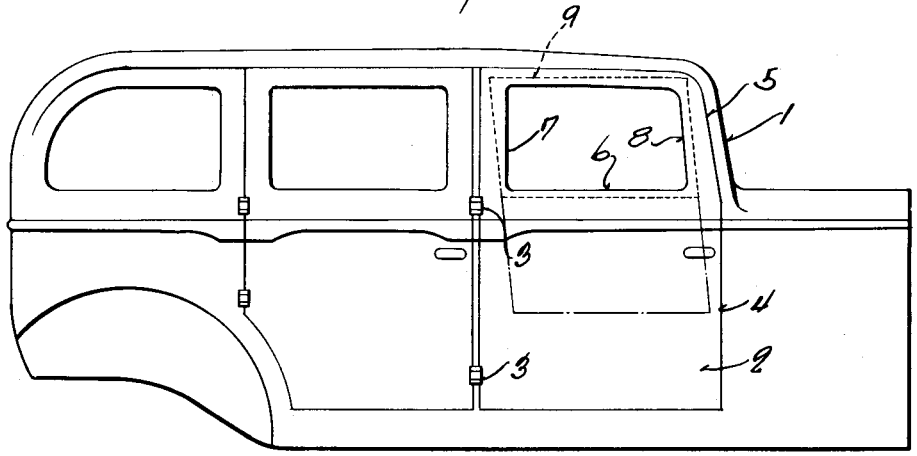
Fig. 1 is a side view of an inclosed automobile body of the type referred to and having a sliding window construction of my invention incorporated in each front door thereof.

The inclosed body of the vehicle, as shown in Fig. 1, is of a type having its windshield 1 inclined rearwardly in accordance with those designs of bodies wherein an anti-glare windshield is provided.

The front door 2 of the body on each side thereof is hinged at 3, 3, at its rear edge to the body structure, and such rear edge of the door is in a vertical straight line from top to bottom as shown. The front edge of the door in that portion 4 thereof from adjacent the base of the windshield down to the bottom of the door is vertical and is substantially parallel to the rear edge of the door. The upper portion 5 of the front edge of the door is inclined rearwardly to accord with the inclination given to windshield 1. The window opening 6 of the door has its rear edge 7 substantially parallel to the rear edge of the door, while its front edge 8 is arranged at a rearward inclination to conform generally to the inclination of the windshield 1 and the adjacent front edge portion 5 of the door as shown in Fig. 1. The structure is so made in order to be in keeping with the inclination given to the windshield and also to permit the use of a maximum width of door below the windshield and with a minimum width for the upper front portion of the door at the windshield to reduce as much as possible the so-called "blind spot" at the front corners of the body between the windshield and the front edges 8 of the window openings in the doors without sacrificing the rigidity and strength required for the doors.

The pane or glass 9 for each door opening 6 is incorporated in the door structure 2, and by a suitable manually operated raising and lowering mechanism to be hereinafter described is movable into and out of position opening and closing the opening 6, as indicated by the dotted and dot and dash lines, respectively, in Fig. 1. With the opening 6 varying in width from top to bottom by reason of its vertically straight rear edge 7 and its inclined front edge 8, the pane 9 is mounted in the door 2 for movement in an oblique direction in the general vertical plane of the door, so that the side edges of the pane will not be displaced out of the opening 6 to provide gaps when the pane is lowered, as would occur should the pane be mounted for movement directly up and down due to the inclination given to the upper portion of the door. Being mounted for oblique movement, the pane 9 may be made larger than the opening 6 to completely close the same when raised and have its side edges parallel to each other and to the inclined front edge 8 of the opening 6 and sufficiently offset inward from the edges 7 and 8 of said opening to be at all times within the same in all positions of the pane.

Figure 2:
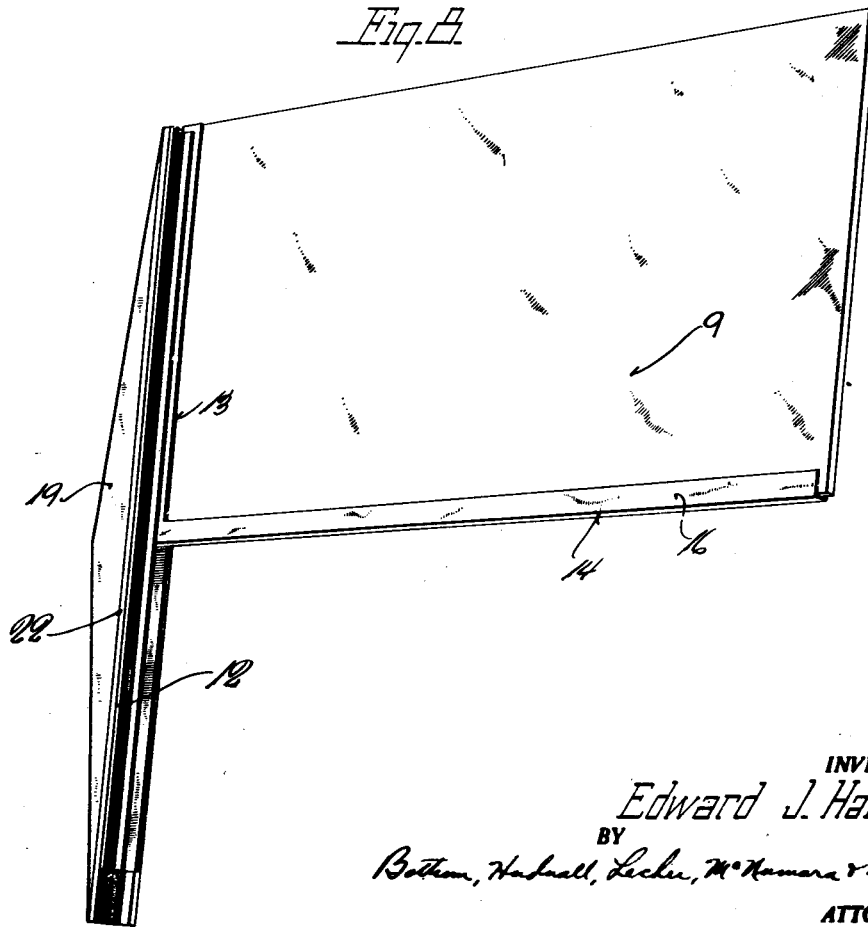
Fig. 2 is an enlarged rear view of one of the front doors with parts broken away to show the sliding window construction of my invention.

As shown in Figs. 2 and 3, the door 2 is of the hollow metal type and has an outside wall 10 of the shape required to conform to the exterior design of the body, and an inside wall 11 to which the finishing lining is secured. Incorporated within the door structure adjacent its front edge is an upwardly extending support and guide 12 preferably made from sheet metal of the desired gauge and strength and bent to have the form shown in Figs. 4 and 6 to provide a channel to receive the vertical leg 13 of the L-shaped pane supporting fixture 14, as shown in Fig. 8. The fixture 14 is channel shape in cross-section and embraces the front and lower edges only of the pane 9, there being a suitable cement or equivalent material 15 in the leg 13 of the fixture to secure the pane therein. The lower edge of the pane may rest in the lower leg 16 of the fixture and be secured therein by cement, if desired. As shown in Fig. 6, the front leg 13 of the fixture is provided with a filler strip 17 between the bottom wall of the leg and the cement 15 to lessen the amount of cement required and to strengthen the leg for its sliding movement in the guide 12.

The guide 12 extends from a point adjacent the upper edge of the door to a point well toward the bottom of the same, and has a length equal to, if not slightly greater than, the extent of movement given to pane 9 in its opening and closing movement so as to support and guide the pane along its front edge throughout the full extent of such movement. The guide 12 is disposed parallel to the front edge of the pane 9 and has its upper and lower ends close to the adjacent portions of the front edge of the door and are secured by screws 18 to a bracket piece 19 of metal or wood fixed in the door structure between the guide 12 and the front edge of the door. When of metal, the bracket piece 19 is flanged, as at 20, 20 (Fig. 4) for welding or otherwise rigidly securing to the wall 21 forming part of the front edge of the door. An L-shaped cushion strip 22 is interposed between the guide 12 and the bracket 19, as shown in Fig. 6, with the screws 18 passing through the strip as shown.

The guide 12, as shown in Fig. 6, is provided along one side with a laterally extending portion forming a groove 23 which opens into the main channel of the guide at its base or inner end to receive a flange portion 24 at the corresponding side of the slide or leg 13. By this arrangement, the slide 13 is retained in the guide and there is a sufficiently long bearing provided between the two to support the full weight of the pane 9 from its front edge only. The result is that the pane does not require a support along its rear edge, thereby simplifying the structure and reducing its cost of construction and installation. The rear edge of the plane need only be supported against lateral movement and this is provided by having the pane extend into a vertical slot 25 in the portion of the door structure along the rear edge of the window opening, as shown in Fig. 5. The sides of the slot 25 are fitted with cushion strips 26, 26 which engage the pane 9 on its opposite sides to prevent rattling of the pane and to prevent its breakage. With the guide 12 arranged parallel to the movement of the pane 9 and as long as the extent of movement given to the pane, the latter is firmly supported at its front edge in all positions of the pane, and no additional guide or support is required for the pane either along its rear edge or elsewhere.

The raising and lowering mechanism for the pane 9 is best shown in Fig. 2. Such mechanism comprises a rack member composed of upper and lower sections 27, 28, connected by a link 29. The lower section 28 is vertically disposed and has its upper end fixed to a bracket plate 30 secured to the horizontal leg 16 of the fixture 14. A crank handle 31, which is located on the inner side of the door is mounted on a shaft, which is suitably journalled in the door construction, and has a pinion 32 to mesh with the teeth of the rack member. The latter is held in mesh with the pinion by a stud or pin 33 fixed to the inner wall 11 of the door adjacent the pinion and between which and the stud the rack member has movement. When the handle is turned in a direction to lift the rack member, the window pane is raised to close the opening 6, whereas when the handle is turned in the opposite direction the window pane is lowered. In this movement, the upper section 27 of the rack member is drawn through the link 29 into alignment with the lower section 28 to form a continuation thereof to permit complete lowering of the pane. A spring (not shown) is associated with the link 29 and so engages the same to constantly urge upward the upper section 27 of the rack member. This causes said section to be positioned in alignment with the lower section 28 when the upper end of the upper section is free of an inturned flange 34 along the upper edge of the wall 11 at the bottom of the window opening 6. Said flange guides the upper section 27 into position lying alongside of the lower edge of the pane 9 when it reaches closed position as shown in Fig. 2. As the section 27 is drawn downward it contacts with a roller or stud 35 on the inner side of the door wall 11, and thus is prevented from being carried to a position where it will not right itself with the lower section 28. The upper section 27 has a lug 36 it its upper or outer end to contact with the stud 33 to stop the downward movement of the pane 9 when it reaches fully open position.

It will be noted that the raising and lowering mechanism is mounted in the door well adjacent its forward edge, and thus has its handle member 31 positioned far enough forward to permit the occupant of the front seat of the car to easily and conveniently operate it. Moreover, with the mechanism so located, the lifting and lowering force required to open and close the window may be applied relatively close to the front edge of the pane, and thus no opportunity is afforded for canting the pane or placing any undue strain on the guide 12 and slide 13. The result is that only a single support and guide is required for the front edge of the pane.

To remove all possible strain from the guide 12 and slide 13, I may provide an additional support which as shown in the drawings, comprises a sheet metal channel member 37 located within the door structure between its outer and inner walls 10 and 11 as clearly shown in Fig. 3. The member 37 is offset to one side of the rack member, and is maintained substantially parallel to the same, so that a roller or stud 38 mounted on the lower section 28 of the rack member at its lower end may move with the rack member in the channel 37 in the raising and lowering of the window pane. To conform to the general inwardly sloping design of the door adjacent its bottom, the inside wall 11 of the door is inclined inwardly as shown in Fig. 3. This requires that the channel member 37 be supported inward from the wall 11 by a suitable spacer or bracket member 39 as shown in said figure. The member 37 is also spaced inward from the wall 11 adjacent its upper end by a suitable spacer or bracket 40, the latter however being considerably shorter than the lower one, so as to conform to the general inclination of the inner wall 11 of the door as shown. The member 37 extends below the handle 31, and in being rigidly attached to the door structure provides an effective guide for the raising and lowering mechanism, and also serves to support the window pane and thus avoids the necessity of a support for the rear edge of the pane.

In Fig. 2 the window pane 9 is shown in full lines in its fully raised position, at which time the pane completely closes the opening 6 in the door. It will be observed that the rear edge 7 of the opening 6 while being vertical and parallel to the rear edge of the door is sufficiently offset inward from the rear edge of the door to provide sufficient metal between the window opening and the rear edge of the door so that the window pane at all times closes the opening in the door. With the window pane moving downward and obliquely forward in the opening of the pane, the distance at the rear edge of the opening is set inward from the rear edge of the door sufficiently to prevent the upper rear corner of the pane from coming out of the opening, when the pane is in fully lowered position as shown by the dot and dash line $a$ in Fig. 2. Consequently no gaps are provided between the window pane and the opening in the door when the pane is in lowered position.

The structure described is particularly applicable to body designs having rearwardly inclined windshields, and permits the window panes in the front doors to be guided and supported for movement in the general direction given to the windshield.

The details of structure and arrangement of parts shown and described may be variously changed and modified without departing from the spirit and scope of my invention.

I claim as my invention:

1. A door for an inclosed automobile body of the type having a rearwardly inclined windshield, said door having a window opening therein with its front edge inclined to accord with the inclination of the windshield, a window pane for said opening, means for raising and lowering said pane, and two guides, one for the pane and the other for the raising and lowering means, said guides being carried by the door in parallel relation to each other and to the inclined front edge of the window opening to support the pane against canting or tilting throughout its entire opening and closing movement.

2. A door for an inclosed automobile body of the type having a rearwardly inclined windshield, said door having a window opening therein, with its front edge inclined to accord with the inclination of the windshield, a window pane for said opening, means for raising and lowering said pane and including an endwise movable member, and two guides, one for the pane and the other for said member, said guides being substantially parallel to each other and to the inclined front edge of the window opening to support the pane against canting or tilting throughout its entire opening and closing movement.

3. A door for an inclosed automobile body of the type having a rearwardly inclined windshield, said door having a window opening therein with its front edge inclined to accord with the inclination of the windshield, a window pane for said opening, means carried by the door and the pane for supporting the pane along its front edge only and for guiding the pane in its opening and closing movement with respect to said opening in a direction substantially parallel to the inclined front edge of the same, said means including a support for the lower edge of the pane, and means carried by the door and operating on the support for the pane along the lower end of the latter for raising and lowering the pane.

4. A door for an inclosed automobile body of the type having a rearwardly inclined windshield, said door having a window opening therein with its front edge inclined to accord with the inclination of the windshield, a window pane for said opening, a supporting member carried by the door adjacent the inclined front edge of the opening in substantially parallel relation thereto and extending above and below the lower edge of the opening to substantially the full extent of the opening and closing movement of the pane, a fixture embracing the lower and the front edges of the pane and having interfitting and sliding connection along its portion at the front edge of the pane with said supporting member, and means carried by the door and acting on the portion of the fixture at the lower edge of the pane for raising and lowering the same.

5. A door for an inclosed automobile body of the type having a rearwardly inclined windshield, said door having a window opening therein with its front edge inclined to accord with the inclination of the windshield, a window pane for said opening, a channel member secured to the door adjacent the inclined front edge of the opening in substantially parallel relation thereto and extending above and below the lower edge of the opening to substantially the full extent of the opening and closing movement of the pane, a fixture embracing the lower and front edges of the pane and having sliding connection along its portion embracing the front edge of the pane with said channel member, said fixture and channel member having an interfitting groove and flange arrangement to provide a support for the pane along its front edge only, and means carried by the door and acting on the portion of the fixture along the lower edge of the pane for raising and lowering the same.

6. A door for an inclosed automobile body of the type having a rearwardly inclined windshield, said door having a window opening therein with its front edge inclined to accord with the inclination of the windshield, a window pane for said opening, means carried by the door and the pane to support the pane along its front edge only and to guide the pane in its opening and closing movement with respect to said opening in a direction substantially parallel to the front edge of the same, said means including a support for the lower edge of the pane, and means carried by the door for raising and lowering the pane, said means engaging the portion of the support along the lower edge of the pane and co-operating therewith to prevent canting or tilting of the pane throughout the entire travel of its opening and closing movement.

In testimony whereof I affix my signature.

EDWARD J. HARDTKE.